US011982192B2

(12) United States Patent
Imbourg et al.

(10) Patent No.: US 11,982,192 B2
(45) Date of Patent: May 14, 2024

(54) DEVICE FOR CONTROLLING AN AIRFLOW GUIDING SYSTEM, IN PARTICULAR IN AN AIRCRAFT TURBINE ENGINE

(71) Applicant: SAFRAN HELICOPTER ENGINES, Bordes (FR)

(72) Inventors: Frédéric Anthony Alain Imbourg, Moissy Cramayel (FR); Pierre Chabanne, Moissy Cramayel (FR); Thibaut Maxime Javoy, Moissy Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 0 days.

(21) Appl. No.: 18/034,988

(22) PCT Filed: Nov. 10, 2021

(86) PCT No.: PCT/EP2021/081232
§ 371 (c)(1),
(2) Date: May 2, 2023

(87) PCT Pub. No.: WO2022/101260
PCT Pub. Date: May 19, 2022

(65) Prior Publication Data

US 2023/0417156 A1 Dec. 28, 2023

(30) Foreign Application Priority Data

Nov. 10, 2020 (FR) ................................. FR2011526

(51) Int. Cl.
*F01D 17/16* (2006.01)
*F04D 29/56* (2006.01)

(52) U.S. Cl.
CPC ......... *F01D 17/162* (2013.01); *F04D 29/563* (2013.01); *F05D 2220/329* (2013.01); *F05D 2240/128* (2013.01); *F05D 2260/60* (2013.01)

(58) Field of Classification Search
CPC ............................ F01D 17/162; F04D 29/563
See application file for complete search history.

(56) References Cited

U.S. PATENT DOCUMENTS

2009/0238681 A1 9/2009 Bouru
2018/0371938 A1 12/2018 Skertic et al.
(Continued)

OTHER PUBLICATIONS

International Patent Application No. PCT/EP2021/081232, International Search Report and Written Opinion dated Jan. 31, 2022, 13 pages (11 pages of original document and 2 pages of English translation).

*Primary Examiner* — Brian O Peters
(74) *Attorney, Agent, or Firm* — Kilpatrick Townsend & Stockton LLP

(57) ABSTRACT

Device (30) for controlling an airflow guiding system (20), comprising at least one actuator (31) configured to translate a control rod (32) between a first and a second end position of a nominal operating range in which at least one vane (21*a*) of the airflow guiding system (20) can be moved between a first and a second angle, the control rod (32) being connected to the vane (21*a*) by a control lever (33) comprising a first control rod (36) and a second control rod (37) which are hinged together. The actuator (31) is configured to bring the control rod (32) into a safety position located beyond the second end position of the nominal operating range and to orient the vane (21*a*) at a safe pitch angle between the first angle and the second angle.

7 Claims, 3 Drawing Sheets

(56) References Cited

U.S. PATENT DOCUMENTS

| | | | | |
|---|---|---|---|---|
| 2019/0390563 | A1* | 12/2019 | Lagarde | F01D 17/26 |
| 2020/0049025 | A1* | 2/2020 | Morgan | F02C 6/20 |

* cited by examiner

DEVICE FOR CONTROLLING AN AIRFLOW GUIDING SYSTEM, IN PARTICULAR IN AN AIRCRAFT TURBINE ENGINE

TECHNICAL FIELD OF THE INVENTION

The present invention relates to the field of aircrafts, and in particular aircraft turbine engines.

More particularly, the invention relates to the control of an airflow guiding system.

PRIOR ART

In general, a turbine engine comprises a compressor, a combustion chamber located at the outlet of said compressor, a high-pressure turbine intended to drive the compressor in rotation and a low-pressure turbine intended to drive the blades of the aircraft in rotation.

The turbine engine further comprises an air flow guiding system, so-called "inlet guide vanes", abbreviated as "IGV" comprising a plurality of fins or variable-pitch inlet guide vanes, positioned upstream of the compressor and allowing improving the efficiency of the compressor, and thus the thermodynamic cycle of the engine at cruising speed. Such a system contributes to reducing the fuel consumption of the aircraft.

By "variable pitch", it should be understood the synchronization of the angular position of all of the vanes of the same stage through a control ring or crown secured to all vanes. Each vane is linked to the control ring via a control connecting rod.

It is known to control the position of the vanes by a cylinder system fastened on a casing and comprising a piston movable in a cylinder chamber between two end positions of a nominal operating range of the engine, the piston being linked to the control crown via a control rod. During the movement of the piston between the first end position and the second end position, the vanes are continuously movable between a first angle and a second angle.

In general, the control of the movement of the piston is carried out by a fluid, for example oil in the case of a hydraulic control, distributor.

In the event of a failure of an element of the vane control kinematics, the position of the piston and thus the pitch angle of the vanes could no longer be known.

There is a need to know the position of the piston and thus the pitch angle of the vanes, at any time, and that being so in a reliable manner.

DISCLOSURE OF THE INVENTION

Hence, the present invention aims to overcome the drawbacks of the control devices of the aforementioned airflow guiding systems.

The objective of the invention is to improve safety in the event of a failure of an element of the vane control kinematics.

Hence, an object of the invention is a device for controlling an airflow guiding system comprising at least one vane movable in rotation about an axis of rotation between a first angle and a second angle, the control device comprising at least one actuator configured to drive a control rod in translation between a first end position and a second end position of a nominal operating range in which the vane is movable between the first angle and the second angle, the control being linked to the axis of the vane by a control lever hinged with respect to a free end of the control rod opposite to the end linked to the actuator.

The control lever comprises a first control connecting rod and a second control connecting rod. Said first connecting rod comprises a first end hinged with respect to the free end of the control rod and a second end, hinged with respect to a first end of the second connecting rod, said second connecting rod further comprising a second end, opposite to the first end and secured in rotation with the vane.

In the event of a failure of the control device, the actuator is configured to bring the control rod into a safety position located beyond the second end position of the nominal operating range and orient the vane in a safe pitch angle between the first angle and the second angle.

The safety position and the safe pitch angle correspond to a so-called safety position enabling the passage of an airflow even in the event of a failure of the control device. Thus, in the event of a failure of the control device, the position of the piston and the pitch angle of the vanes are known at any time, and that being so in a reliable manner.

Advantageously, the actuator is configured to transmit a purely axial movement to the control rod according to an axis of movement of said actuator.

According to one embodiment, the control lever comprises only the first and second control connecting rods which are hinged together and linked by a ball-joint connection.

The airflow guiding system may be a blading of the type with an inlet guide blading or with a variable pitch so-called "inlet guide vanes", abbreviated as "IGV", comprising a plurality of stator fins or vanes comprising a main vane linked to the control lever and a plurality of secondary vanes whose movement is synchronized with the movement of the main vane, the control device further comprising a control ring or crown linked to the control lever and linked to the secondary vanes via secondary connecting rods, the axis of rotation of the vanes being perpendicular to the axis of the control ring.

Thus, each secondary vane is linked to the control ring by a control connecting rod.

By "variable pitch" vanes, it should be understood the synchronization of the position of all of the secondary vanes with respect to the main vane.

By "stator" vanes, it should be understood vanes carried by the stator and movable in rotation about their own axis of rotation.

According to one embodiment, the second control connecting rod has a length substantially equal to the lengths of the secondary connecting rods, the control ring being hinged on said second control connecting rod at a point coincident with the ball-joint connection between the two control connecting rods.

According to another embodiment, the second control connecting rod has a length larger than the lengths of the secondary connecting rods, the control ring being hinged on said second control connecting rod at a point distant from the ball-joint connection between the two control connecting rods.

For example, the control device may comprise two actuators, for example, diametrically opposed.

The actuator may comprise an actuator rod linked to the control rod by a rigid connection or by a ball joint connection.

Without limitation, the actuator may be a cylinder comprising a body delimiting a cylindrical chamber inside which a piston is mounted in translation including one end linked to the control rod, the piston being configured to perform an over-stroke upon movement of the control rod into the safety position.

The body of the cylinder may include two orifices opening into the chamber for the inlet and the outlet of a fluid, intended to make the piston slide inside said cylinder body according to the axial axis. For example, the chamber of the cylinder is supplied with fluid, for example oil, by an external energy source conveying the fluid into the chamber of the cylinder via the first orifice. Under the effect of the pressure exerted by the fluid on the rear face of the piston, the latter moves axially along its axis, together with the control rod. The external energy source may be a hydraulic control system comprising a distributor or servo-valve configured to distribute the fluid in the chamber of the cylinder. According to the servo-valve, it is possible to know the stroke of the piston.

According to another aspect, the invention relates to an aircraft turbine engine comprising, from upstream to downstream in the flow direction of the airflow, an inlet sleeve receiving air, a centrifugal compressor, an annular combustion chamber, located downstream of the compressor, a high-pressure power turbine intended to drive the compressor in rotation, an output turbine intended to drive an output shaft in rotation, through a low-pressure shaft, an airflow guiding system positioned upstream of the compressor and a control device for said airflow guiding system as defined before.

Advantageously, the axis of rotation of the vane of the airflow system is perpendicular to the central axis of the turbine engine.

The nominal operating range corresponds to the nominal operating range of the turbine engine.

The actuator rod is movable according to the axial axis of the turbine engine.

According to another aspect, the invention relates to a single-engine helicopter comprising a turbine engine as defined before.

BRIEF DESCRIPTION OF THE DRAWINGS

Other aims, features and advantages of the invention will appear upon reading the following description, given only as a non-limiting example, and made with reference to the appended drawings wherein.

DETAILED DISCLOSURE OF AT LEAST ONE EMBODIMENT

In the following description, the terms “upstream” and “downstream” are defined with respect to the direction of air circulation in the turbine engine.

Figure 1:
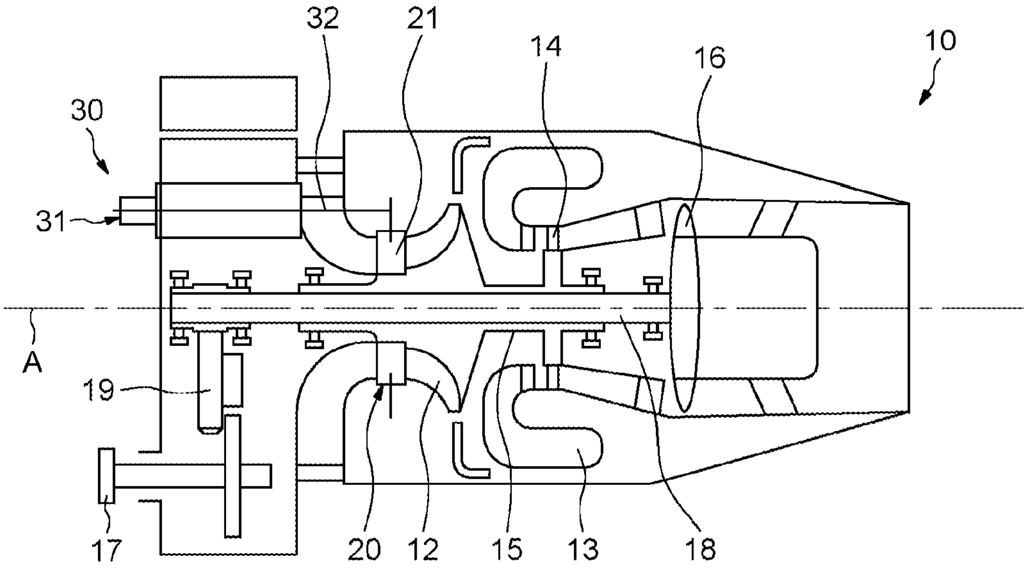
FIG. 1 illustrates in a very schematic way a sectional view of an aircraft turbine engine comprising a device for controlling an airflow guiding system according to the invention.

In FIG. 1, an axial section of a turbine engine 10, with a central axis A which corresponds to the axis of a power shaft (or low-pressure shaft) of the turbine engine, is represented in a very schematic way. As a non-limiting example, the turbine engine may equip single-engine helicopters.

The turbine engine 10 comprises, from upstream to downstream in the flow direction of the airflow, an inlet sleeve 11 receiving air, a centrifugal compressor 12, for example with one or two stage(s), configured to suck in the airflow F. The turbine engine 10 further comprises an annular combustion chamber 13, for example a reverse flow one, located downstream of the compressor 12, a high-pressure power turbine 14 intended to drive the compressor 12 in rotation by a high-pressure shaft 15 and an output turbine 16, for example, a single-stage one, intended to drive an output shaft 17 in rotation through a low-pressure shaft 18, coaxial with the high-pressure shaft 15, and a reduction system 19.

The output shaft 17 is linked to the blades of the aircraft.

The turbine engine 10 further comprises an airflow guiding system 20, called “inlet guide vanes”, abbreviated as “IGV”, comprising a plurality of variable-pitch fins or guide vanes 21, positioned upstream of the compressor 12.

The plurality of variable-pitch vanes 21 comprises a main vane 21*a* and a plurality of secondary vanes 21*b* whose movement is synchronized with the movement of the main vane 21.

The blading 21 consisting of the vanes 21*a*, 21*b* is so-called a “stator” one, i.e. each vane 21*a*, 21*b* is movable in rotation about its own axis of rotation.

The axis of rotation of the vanes 21*a*, 21*b* is herein perpendicular with respect to the central axis A of the turbine engine 10.

The turbine engine 10 further comprises a device 30 for controlling the airflow guiding system 20.

The control device 30 of the airflow system 20 comprises an actuator 31, a control rod 32 driven in translation by said actuator 31 and linked to the axis of the main vane 21*a* by a control lever 33. The control device 30 further comprises a control ring or crown 34 linked to the control lever 33 and hinged with respect to the latter and hinged with respect to secondary connecting rods 35 which are secured in rotation with the secondary vanes 21*b*. In other words, each secondary vane 21*b* is linked to the control ring 34 by a control connecting rod 35.

By “variable-pitch” vanes, it should be understood the synchronization of the position of all of the secondary vanes 21*b* with respect to the main vane 21*a*.

The axis of rotation of the vanes 21*a*, 21*b* is perpendicular to the axis of the control ring 34.

Without limitation, the actuator 31 may be a cylinder comprising a body fastened on a casing (not referenced) and delimiting a cylindrical chamber inside which a piston is mounted in translation including one end linked to the control rod 32.

The control rod 32 is linked to the axis of the vane 21*a* through the control lever 33 hinged with respect to a free end 32*a* of the control rod 32 opposite to the end linked to the actuator 31.

The body of the cylinder may include two orifices opening into the chamber for the inlet and the outlet of a fluid, intended to make the piston slide inside said cylinder body according to an axis of movement X-X' substantially parallel to the central axis A of the turbine engine 10.

For example, the chamber of the cylinder is supplied with fluid, for example oil, by an external energy source conveying the fluid into the chamber of the cylinder via the first orifice. Under the effect of the pressure exerted by the fluid on the rear face of the piston, the latter moves axially along the axis X-X', together with the control rod 32.

The external energy source may be a hydraulic control system comprising a distributor or servo-valve configured to distribute the fluid in the chamber of the cylinder. According to the servo-valve, it is possible to know the stroke of the piston.

Figure 2:
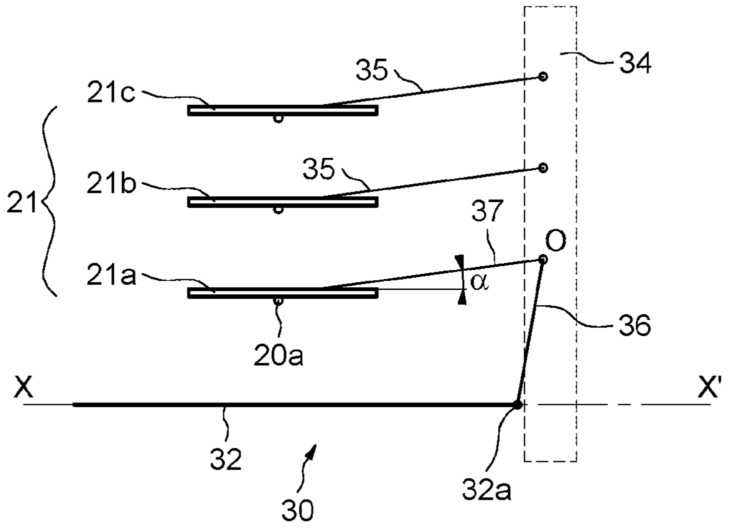
FIG. 2 represents the flow guiding system of FIG. 1.

The piston of the cylinder is movable in translation in the chamber of the cylinder between two end positions of a nominal operating range of the turbine engine. During the movement of the piston between the first end position and the second end position, the main vane 21*a* is continuously movable between a first angle α1 and a second angle α2 defined respectively between the main vane 21*a* and the horizontal axis parallel to the axis of movement X-X'. The fixed angle α, shown in FIG. 2, is defined between the main vane 21*a* and a second control connecting rod 37 secured in rotation with this main vane.

The control device 30 is configured to guide the piston, and thus the control rod 32 towards a safety position in which the stroke of the piston is known, and thus the opening angle of the vanes 21*a*, 21*b*.

The safety position PS corresponds to an opening position of the vanes in which the turbine engine can operate in a safe manner. The main vane 21*a* is moved from the second angle α2 to a safe angle αS.

The safety position PS is away from one of the positions P1, P2 of the nominal operating range.

The piston is configured to perform an over-stroke beyond one of its end positions.

Figure 3:
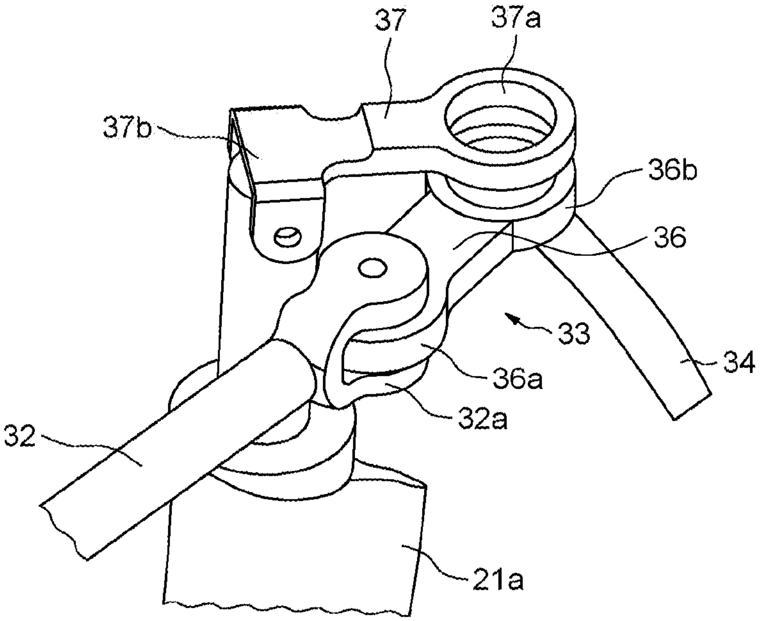
FIG. 3 is a perspective detail view of the control device of FIG. 1.

As illustrated in FIG. 3, the control lever 33 comprises two distinct parts, namely a first control connecting rod 36 and a second control connecting rod 37.

The first control connecting rod 36 comprises a first end 36*a* hinged with respect to the free end of the control rod 32, opposite to the end linked to the piston and a second end 36*b*, hinged with respect to a first end 37*a* of the second control connecting rod 37. In other words, the two control connecting rods 36, 37 are linked by a ball-joint connection.

The second control connecting rod 37 further comprises a second end 37*b*, opposite to the first end 37*a* hinged with respect to the first connecting rod 36, secured in rotation with the main vane 21*a*. In other words, the second control connecting rod 37 is fastened to the main vane 21*a* so as to be secured in rotation therewith, i.e. the entire second connecting rod rotates with the main vane 21*a*. The axis of rotation of the main vane 21*a* is referenced 20*a*.

The free end of the piston is linked to the control rod 32 through a rigid or ball-joint connection.

As illustrated in FIG. 3, the second control connecting rod 37 has a length substantially equal to the lengths of the secondary connecting rods 35. The control ring 34 is hinged on said second control connecting rod 37 at a point coincident with the ball-joint connection between the two control connecting rods 36, 37.

The control rod 32 is configured to move only in translation according to the axis of movement X-X' during the movement of the piston of the cylinder. The control rod 32 has one single degree of freedom, namely according to the axis of movement X-X'.

Figure 4:
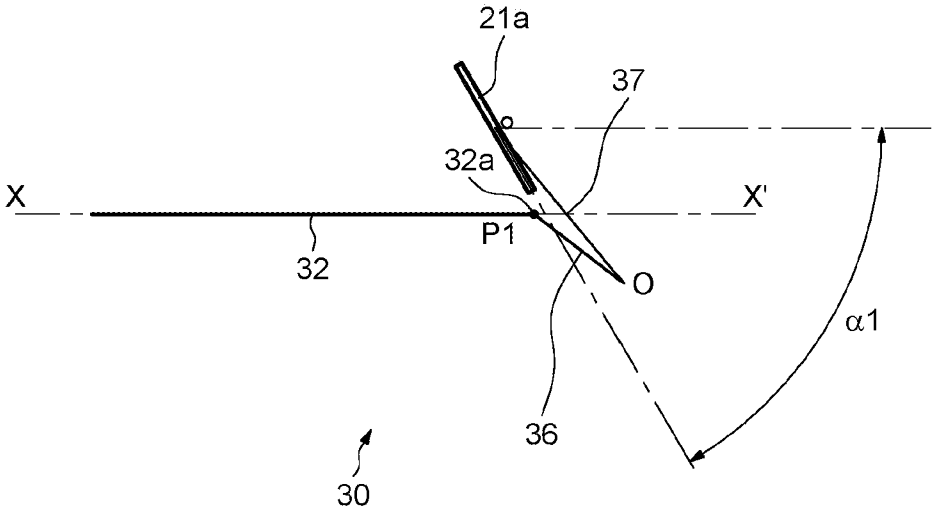
[FIG. 4]
Figure 5:
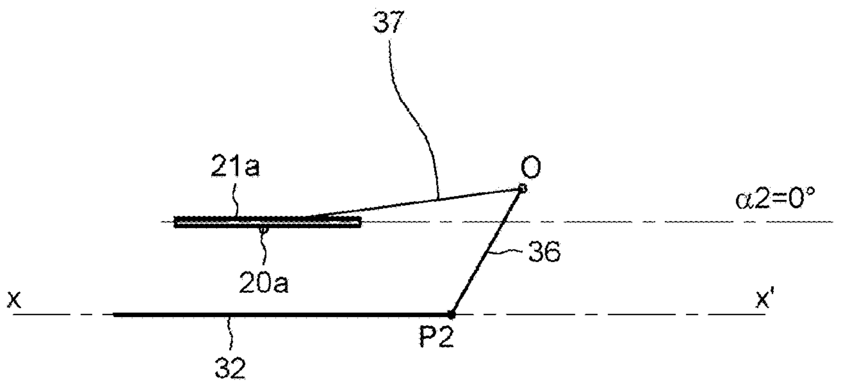
[FIG. 5]
Figure 6:
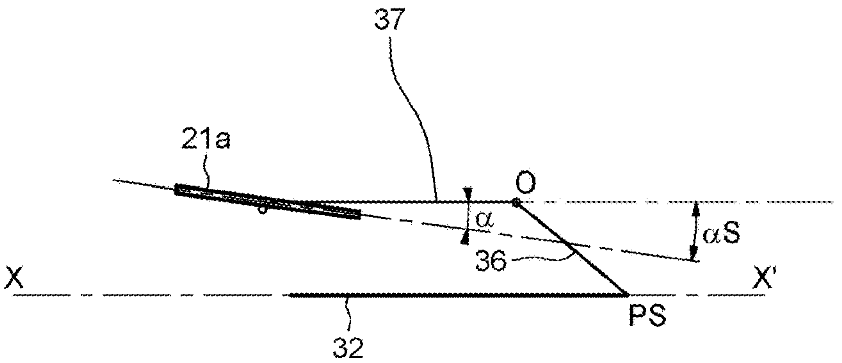
FIG. 6 schematically represent three positions of the control device and of the main vane of the flow guiding system of FIG. 1.

The movement of the control rod 32 is illustrated in FIGS. 4 to 6.

FIG. 4 represents the first end position P1 of the free end 32*a* of the control rod 32 when the actuator rod or piston is in the first end position of the nominal operating range of the turbine engine 10. In the first end position P1 of the control rod 32, the main vane 21 a is opened by a first angle α1, for example comprised between 45° and 75°, for example larger than or equal to 60°.

FIG. 5 represents the second end position P2 of the free end of the control rod 32 when the actuator rod or piston is in the second end position of the nominal operating range of the turbine engine 10. During the movement of the control rod 32 from the first end position P1 towards the second end position P2, the main vane 21*a* is progressively movable from the first angle α1 towards a second angle α2, for example equal to 0°. The flow rate is maximum in this second end position.

FIG. 6 represents the safety position PS of the free end of the control rod 32 when the actuator rod or piston performs an over-stroke or extends beyond the second end position of the nominal operating range of the turbine engine 10. During the movement of the control rod 32 from the second end position P2 towards the safety position PS, the main vane 21*a* is progressively movable from the second angle α2 towards a safe pitch angle αS between the angles α1 and α2, for example comprised between 5° and 15°, for example equal to 8°. In the represented example, the fixed angle α is provided equal to the safe pitch angle αS, such that when the safety position PS is reached, the second control connecting rod 37 is oriented parallel to the axis of movement X-X'. Nevertheless, the angles α and αS may be provided different from each other without departing from the scope of the invention. For example, an additional over-stroke of the actuator rod and therefore of the control rod 32, so as to move the safety position PS, would increase the value of the safe pitch angle αS while the angle α remains fixed.

Figure 7:
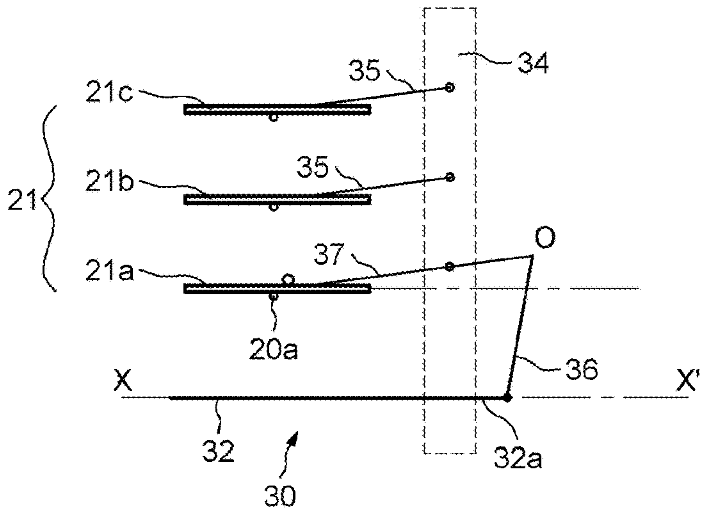
FIG. 7 represents the flow guiding system according to another embodiment.

In the embodiment illustrated in FIG. 7, in which the same elements bear the same references, the second control connecting rod 37 has a length larger than the lengths of the secondary connecting rods 35. The control ring 34 is hinged on said second control connecting rod 37 at a point distant from the ball-joint connection between the two control connecting rods 36, 37.

A linear relationship is obtained between the position of the actuator rod 32 and the pitch angle of the main vane 21*a*.

In general, the use of the control device 30 is not limited to a turbine engine and can be used to ensure the movement of the control rod and thus the orientation of fins mounted upstream of a steered wheel towards a safety position in the event of failure of an element of said control device. The safe pitch angle of the vanes is within the pitch angle range useful for nominal operation of the steered wheel. This safe pitch angle is reached upon an over-stroke of an actuator rod of the control device.

Thanks to the invention, it is possible to bring the control rod and thus the pitch angle of the vanes towards a reliable safety position.

The invention claimed is:

1. A device for controlling an airflow guiding system comprising at least one vane movable in rotation about an axis of rotation between a first angle and a second angle, the control device comprising at least one actuator configured to drive a control rod in translation between a first end position and a second end position of a nominal operating range in which the vane is movable between the first angle and the second angle, the control rod being linked to the axis of the vane by a control lever hinged with respect to a free end of the control rod opposite to the end linked to the actuator, characterized in that:

the control lever comprises a first control connecting rod and a second control connecting rod, said first connecting rod comprising a first end hinged with respect to the free end of the control rod and a second end hinged with respect to a first end of the second connecting rod, said second connecting rod further comprising a second end, opposite to the first end and secured in rotation with the vane, and in that:

the actuator is configured to bring the control rod into a safety position located beyond the second end position of the nominal operating range and orient the vane by a safe pitch angle between the first angle and the second angle, wherein the control lever comprises only the first and second control rods, and these are hinged together by a ball-joint connection, wherein the airflow guiding system comprises a plurality of variable-pitch stator vanes comprising a main vane linked to the control lever and a plurality of secondary vanes whose movement is synchronized with the movement of the main vane, the control device further comprises a control ring linked to the control lever and linked to the secondary vanes through secondary connecting rods, the axis of rotation of the vanes being perpendicular to the axis of the control ring, and wherein the second control connecting rod has a length substantially equal to the lengths of the secondary connecting rods, the control ring being hinged on said second control connecting rod at a point coincident with the ball-joint connection between the two control connecting rods.

2. The device according to claim 1, wherein the actuator is configured to transmit a purely axial movement to the control rod according to an axis of movement of said actuator.

3. The device according to claim 1, wherein the actuator comprises an actuator rod linked to the control rod by a rigid connection.

4. The device according to claim 1, wherein the actuator is a cylinder comprising a body delimiting a cylindrical chamber inside which is a piston mounted in translation including one end linked to the control rod, the piston being configured to perform an over-stroke upon movement of the control rod into the safety position.

5. An aircraft turbine engine comprising, from upstream to downstream in a flow direction of the air flow, an inlet sleeve receiving air, a centrifugal compressor, a annular combustion chamber, located downstream of the compressor, a high-pressure power turbine intended to drive the compressor in rotation, an output turbine intended to drive an output shaft in rotation, an airflow guiding system positioned upstream of the compressor and a device for controlling said airflow guiding system according to any one of the preceding claims.

6. A turbine engine according to claim 5, wherein the axis of rotation of the vane of the airflow system is perpendicular to a central axis of the turbine engine.

7. A single-engine helicopter comprising a turbine engine according to claim 5.

* * * * *